United States Patent [19]

Delignières

[11] Patent Number: 4,559,621

[45] Date of Patent: Dec. 17, 1985

[54] TELEMETERING ACOUSTIC METHOD FOR DETERMINING THE RELATIVE POSITION OF A SUBMERGED OBJECT WITH RESPECT TO A VEHICLE AND DEVICE THEREFOR

[75] Inventor: Robert Delignières, Mareil Marly, France

[73] Assignee: Institut Francais du Petrole, Rueil-Malmaison, France

[21] Appl. No.: 455,707

[22] Filed: Jan. 5, 1983

[30] Foreign Application Priority Data

Jan. 5, 1982 [FR] France ............................ 82 00042

[51] Int. Cl.[4] ........................ G01S 3/80; G01V 1/38
[52] U.S. Cl. .................................. 367/130; 367/19; 367/106; 367/117
[58] Field of Search ............... 367/19, 106, 130, 117

[56] References Cited

U.S. PATENT DOCUMENTS

| | | | |
|---|---|---|---|
| 3,831,136 | 8/1974 | Sagoci ................................ | 367/19 |
| 3,953,827 | 4/1976 | Le Moal et al. .................... | 367/19 |
| 4,037,189 | 7/1977 | Bell et al. ........................ | 367/130 X |
| 4,087,780 | 5/1978 | Itira et al. ........................ | 367/19 X |
| 4,187,492 | 2/1980 | Deligniers ........................ | 367/130 X |

*Primary Examiner*—Richard A. Farley
*Attorney, Agent, or Firm*—Millen & White

[57] ABSTRACT

The position of a submerged object towed at great depth from a ship is determined, with respect to the ship, from measured values of the travel time of acoustic pulses between the ship and the object. These pulses are emitted at different locations of the ship and received at a point of the object. The values of the travel times of the pulses are measured and digitized on the object and transmitted by cable to the ship where they are processed, in combination with values representing the distances between the emission locations, to determine the coordinates of the object with respect to a system of axes associated with the ship.

13 Claims, 6 Drawing Figures

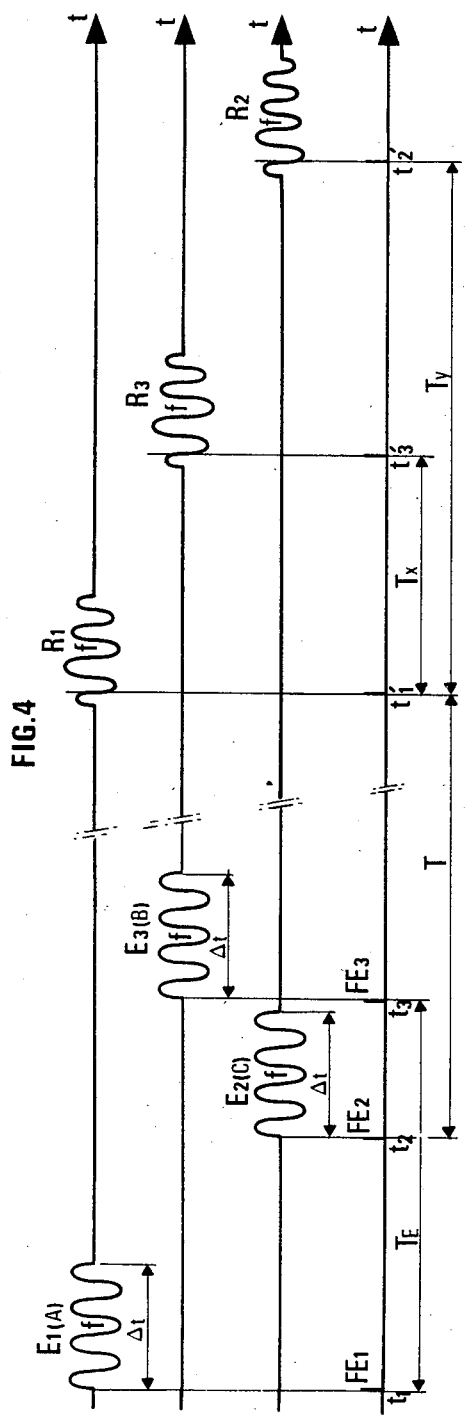
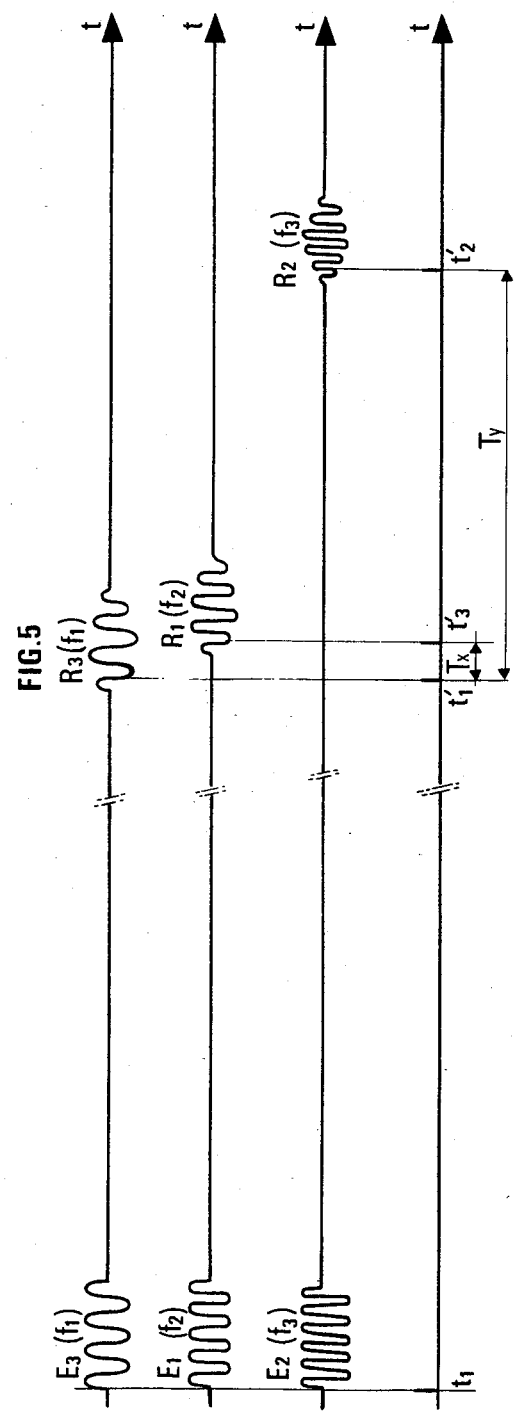

TELEMETERING ACOUSTIC METHOD FOR DETERMINING THE RELATIVE POSITION OF A SUBMERGED OBJECT WITH RESPECT TO A VEHICLE AND DEVICE THEREFOR

BACKGROUND OF THE INVENTION

This invention relates to an acoustic telemetering device for determining the relative position of a submerged object with respect to a vehicle.

More particularly, the invention concerns an acoustic telemetering device for determining the position of a submerged towed object with respect to a towing ship. This towed object is, for example, a profiled body or "fish" connected through a cable to a ship and containing oceanographic apparatuses. It performs sub-surface evolutions at a certain distance from the bottom and contains, for example, an echo-sounder, a Doppler sonar or lateral sonar adapted to determine its trajectory with respect to the bottom of the water layer or to produce echograms of the bottom suface or of the underlying layers. Such a fish is described, for example, in the French Pat. No. 2 412 853.

When the ship moves over deep bottoms, the cable through which it is connected to the fish may reach very great lengths (several kilometers). Due to the drag of the towing cable, to the variations of the towing speed and to the currents, the position of the fish may vary substantially, thus making it difficult to know accurately its location.

A first known prior art method consists of laying on the water bottom an assembly of beacons located at known positions and to determine, with respect to the latter, both the position of the towing ship and that of the submerged fish. This method requires, in the case of a large evolution zone of the ship, the immersion of a great number of locating beacons and their frequent displacement, thus making its application difficult.

A second known method, which can be used independently of the extent of the navigation zones, consists of determining, by acoustic means, the relative position of the fish with respect to the ship, the position of the latter being determined by making use of locating systems at sea of another known type such as radio positioning systems.

A known device for carrying out this second method comprises acoustic wave sensors secured under the ship, near each other and an acoustic pulse emitter, placed on the fish. An acoustic telemering system is adapted to measure the propagation time of acoustic pulses transmitted from the emitter and respectively received by the sensors. The initial instant used as a reference for measuring the time intervals is that at which an emission order is transmitted, through the cable connecting the ship to the fish, for actuating the pulses emitter placed therein.

Another known device making use of the same method also comprises acoustic wave sensors secured under the ship in the vicinity of one another, an acoustic pulse emitter rigidly secured to the fish and also as a telemetering system measuring the time intervals for the acoustic pulses propagation between the emitter and the sensors. It differs from the preceding one in that the emission order is transmitted to the emitter located in the fish by means of an acoustic signal which propagates through water from the ship.

The known method, consisting of transmitting an acoustic signal from the fish and receiving it on the ship, suffers from disadvantages. The signal, very substantially weakened during its propagation from the object, is received in a high noise zone (noise of machines, wind, waves, noises generated by the surface navigation, etc . . . ) and the signal-to-noise ratio is low, being thus prejudicial to the accuracy of the effected telemetering measurements.

Besides, the acoustic wave sensors are generally secured under the hull of the ship at the immediate vicinity of one another, thus having a further unfavorable effect on the accuracy of the effected measurements.

SUMMARY OF THE INVENTION

By the method according to the invention, it is possible to determine the relative position of an object submerged at great depth with respect to a ship towing this object at the end of a cable, by measuring the propagation time of acoustic pulses between n different locations of emission on the ship and a receiving location on the submerged object. It comprises:

emitting a sequence of n acoustic pulses, each of which is emitted from one of the emission locations of the ship, the sequence emission period being so short that the displacement of the ship during said period is negligible, successively receiving at said reception location the emitted pulse sequence, measuring on the submerged object the respective propagation times of the emitted pulses of the sequence, digitizing the measured values, transmitting by cable the digitized data, and combining, on the ship, the different transmitted measurement values by making use of the distances between the locations of emission and of the time intervals between the pulses of each sequence.

According to a first embodiment, the acoustic pulses emitted from the different locations have the same frequency and are sequentially emitted. According to a second embodiment, the acoustic pulses emitted from the different locations have distinct frequencies and are simultaneously emitted.

The method according to the invention offers, as compared to prior art methods, the advantage that the transmitted acoustic waves are received far from the surface in quiet waters. The submerged object is generally well profiled and the noise inherent to its hydrodynamic drag is very low as compared to the noises of various origins associated with the surface navigation. The signal-to-noise ratio obtained by the method according to the invention is consequently far better. This results in an increased accuracy obtained when measuring the propagation times of the acoustic signals or of their relative phases since, as well known in the art, the errors in these measurements are in inverse proportion of the square root of the signal-to-noise power ratio.

The method according to the invention also offers the advantage that the propagation times are measured on the submerged object and are digitized before being transmitted through the cable to the ship. The encoded signals representing the digitized mesurement values and transmitted by cable may be easily reconstituted, even if they were deformed by a long propagation or are subjected to random phase variations as a result of non-homogeneous characteristics of the transmission cable and accordingly the accuracy of the distance measurements effected on the submerged object can be preserved.

The device for carrying out the invention comprises means for emitting acoustic waves at several different locations of the vehicle, means, located on the ship, for generating pulses of the same duration and of the same frequency at time intervals, these pulses being respectively transmitted to the emission means, means for receiving the pulses on the submerged object, and means for computing the coordinates of the object with respect to the vehicle. It further comprises a clock member, placed in the submerged object, for generating a signal defining a time scale, adapted to control the pulse generating means, time measuring means and a phase shift measuring assembly, associated with said object, for measuring the propagation time of the different pulses of each sequence, in periods of the signal generated by the clock member, and means, associated with said object, for measuring the depth in water of the latter, said means, as well as the time measuring means and the phase shift measuring assembly, comprising, as an integral part, digitizing means adapted to digitize the measured values by making use of the signal generated by the clock member, and a system for transmitting the measured values from the submerged object to the computation means on the ship.

BRIEF DESCRIPTION OF THE DRAWINGS

Other characteristics and advantages of the method according to the invention and of the device for carrying out the same will be made apparent from the following description given with reference to the accompanying drawings wherein:

FIG. 4 shows chronograms of the different acoustic pulses emitted and received according to a first embodiment of the method;

FIG. 5 shows chronograms of the same pulses according to a second embodiment of the method.

DETAILED DISCUSSION OF THE INVENTION

The system according to the invention is adapted, for example, to determine the position of a profiled body or "fish" 1 (FIG. 1) with respect to a vehicle such as a ship 2 to which it is connected through a multi-functional cable 3, comprising towing cables and electrical conductors, whereby data are transmitted between oceanographic and electronic apparatuses of any type contained in the fish and data processing apparatuses placed on the towing ship 2. A deflector 23 of known type is secured to the lower end of cable 3 in order to maintain the fish 1 immersed at great depth.

Figure 2:
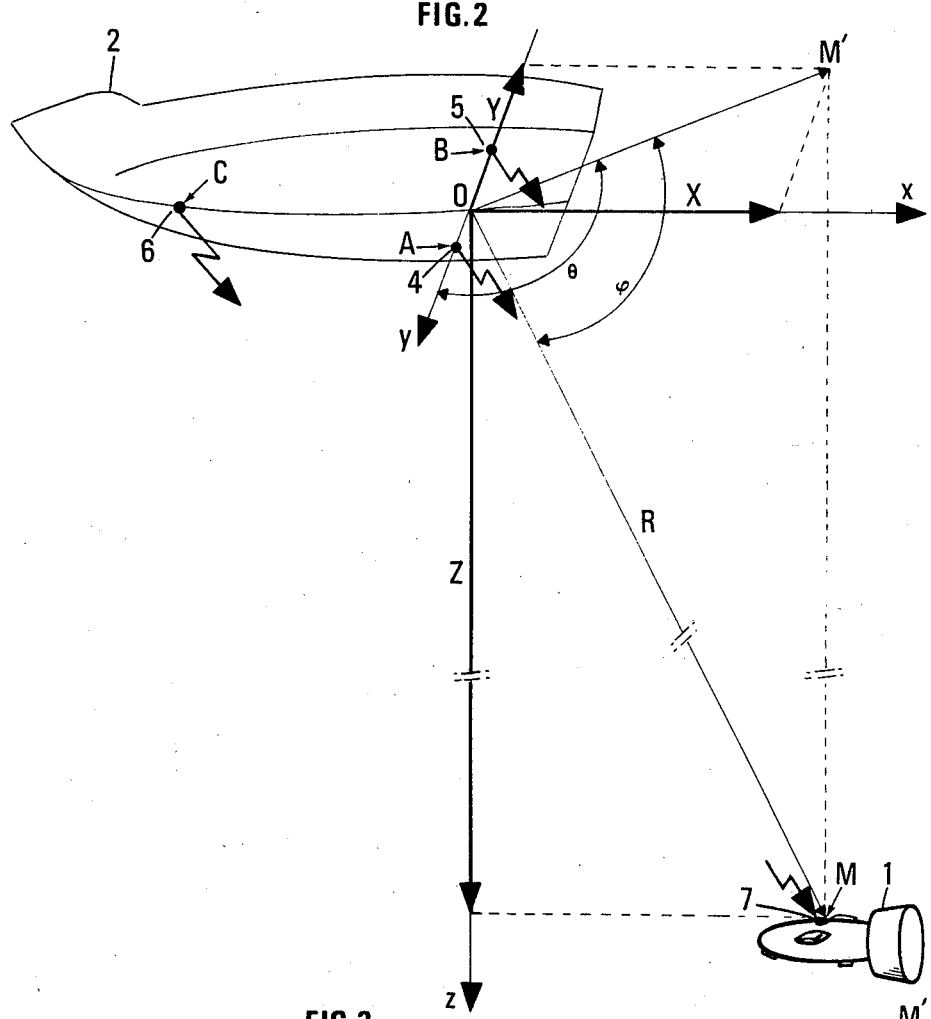
FIG. 2 diagrammatically shows a location of the emission means under the vehicle and the system of axes (O, x, y, z) whereby the position of the object with respect to the vehicle can be determined.

Transducers 4, 5 and 6 (FIG. 2) for emitting acoustic waves are secured to the hull of the ship 2 at locations which are at the greatest possible distance from one another and preferably incorporated into profiled bodies so as to reduce the flow turbulences. These bodies (not shown) are secured to the hull of the ship and the transducers included therein are controlled, for example, by means of connecting electrical conductors passing through the hulls.

Two of the transducers (4, 5) are placed along an axis perpendicular to the longitudinal axis of the ship at two positions A and B symmetrical with respect to said axis. The third transducer 6 is placed at a point C on the longitudinal axis. The lateral spacing between the two transducers 4 and 5 and the distance between point C and the transverse axis joining A and B are chosen to be as large as possible within limits compatible with the ship size. M designates the location of the fish 1 at which is secured a transducer receiver 7, Ox, Oy, Oz are three axes respectively oriented in the directions of the longitudinal axis of the ship, of the transverse axis passing through points A and B and of a vertical line, the common origin of these axes being the middle of segment AB, X, Y and Z are the coordinates of point M in this system of axes and R is the distance OM. The angle between the projection OM' of OM on the plane xOy and the axis y is designated by $\theta$, the angle between the same projection and OM is designated by $\alpha$.

Figure 3:
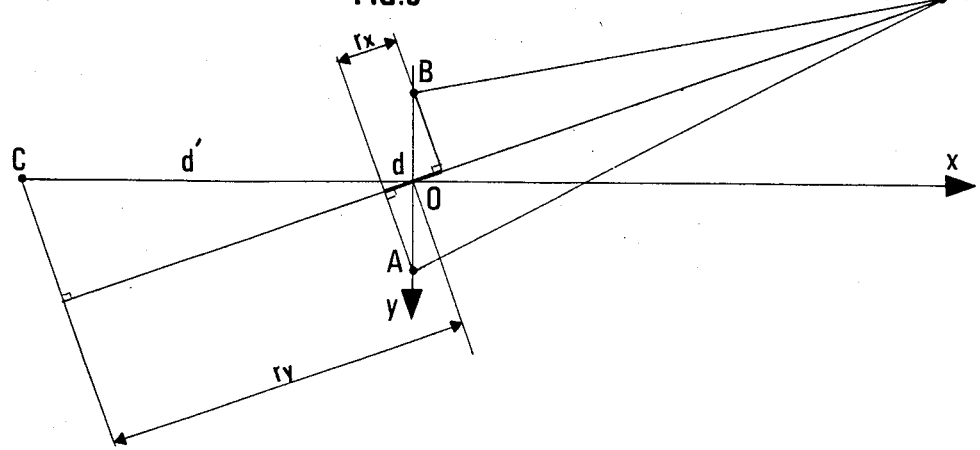
FIG. 3 shows a projection on plane Oxy of the emission locations and of the position of the submerged object.

The projection of segment AB (FIG. 3) on direction OM' is designated by $r_x$ and the projection of segment OC on the same direction is designated by $r_y$. Finally d and d' respectively designate distances AB and OC.

It can be easily established that the coordinates X and Y of point M, with respect to the system of axes O, x, y and z associated with the ship, can be obtained by the following relationships:

$$X = \frac{R}{d} r_x \cos \phi \qquad (1)$$

$$Y = \frac{R}{d'} r_y \cos \phi$$

In order to determine the depth Z in water of the fish 1, a pressure measuring device (not shown) is incorporated therein.

The values of R, $r_x$, $r_y$ which, in combination with the values of Z given by the pressure measuring device and with the values of d and d' determined at the construction, make it possible to calculate the coordinates of the fish with respect to the ship, are obtained by telemetering measurements.

According to a first embodiment of the method, each acoustic wave emission-reception cycle comprises (FIG. 4) the emission at point A at instant $t_1$ of a pulse $E_1$ of duration $\Delta t$ and of a specific frequency f, then the emission at point C of a second identical pulse $E_2$ at instant $t_2$, after $t_1$, and, finally, the emission at point B of a third pulse, also identical, $E_3$, at instant $t_3$, after $t_2$. These three pulses propagate towards the submerged fish and are successively received by the transducer-receiver 7 located at point M, at instants $t'_1$, $t'_3$, $t'_2$ depending on the respective propagation times of the signals. Generally, $t'_2$ is subsequent to $t'_3$ as a result of the selected spacing d'. As the transmitted pulses are deformed during propagation, the received acoustic signals $R_1$, $R_3$, $R_2$ are amplified and re-shaped, so as to make possible an accurate determination of their respective arrival instants $t'_1$, $t'_3$, $t'_2$. This re-shaping step comprises for example a comparison of the amplitude of the signals with a determined threshold value.

$T_E$ is used to designate the time interval $(t_1, t_3)$ between the leading edges $FE_1$ and $FE_3$ of pulses $E_1$ and $E_3$, T designates the time interval $(t_2, t'_1)$ between the leading edge $FE_2$ of pulse $E_2$ and the instant at which the amplitude of the received pulse $R_1$ passes through the threshold value, $T_x$ designates the interval $(t'_1, t'_3)$ between the instants at which the amplitudes of the pulses $R_1$ and $R_3$ reach the threshold value and finally $T_y$ designates the interval $(t'_1, t'_2)$ between the instants at which the amplitudes of pulses $R_1$ and $R_2$ also reach the required threshold value.

It is easily established that, by measuring the time intervals $T$, $T_x$, $T_y$ and the depth $Z$ and by making use of the predetermined value $T_E$, the different required parameters $R$, $r_x$, $r_y$ and $\cos \alpha$ can be calculated from the following relationships:

$$R = c(T + kT_x) \quad (2)$$

$$r_x = c(T_x - T_E)$$

$$r_y = c(T_y - kT_x)$$

$$\cos \phi = \sqrt{1 - Z^2/R^2}$$

wherein c designates the velocity through water of the acoustic waves and k a number equal to the ratio between the time intervals $(t_2 - t_1)$ and $(t_3 - t_1)$. The values of $R$, $r_x$, $r_y$, $\cos \alpha$ being determined, the coordinates X and Y of point M can then be calculated by application of the relationships (1).

The time intervals $(t_2 - t_1)$, $(t_3 - t_1)$ are selected so that, independently of the position of point M under effective operating conditions, the pulses $R_1$, $R_3$ and $R_2$ are received consecutively, so that it is possible to unambiguously associate the received pulses with the corresponding emitted pulses, irrespective of the position of the submerged fish behind the ship.

According to a second embodiment of the method (FIG. 5), the pulses $E_1$, $E_2$ and $E_3$ are simultaneously transmitted but their respective frequencies $f_1$, $f_2$, $f_3$ are different from one another, so as to make possible the unambiguous identification of their successive instants of arrival $t'_1$, $t'_3$, $t'_2$ at point M of the object. The relationships whereby $R$, $r_x$, $r_y$ and $\cos \alpha$ can be determined are identical to those of group (2) but, in the present case, the time intervals $T_E$ and $t_2 - t_1$ are reduced to zero.

From the relationships (1) and (2) and irrespective of the embodiment which is used, it can be seen that, by placing the emission points A, B, C at locations of the ship hull the most remote from one another, the values d and d' and the differences in the propagation times $T_x$, $T_y$ for a determined value $T_E$ are increased and accordingly, the relative errors in the measuring values of $r_x$, $r_y$ and coordinates X, Y are reduced.

Figure 1:
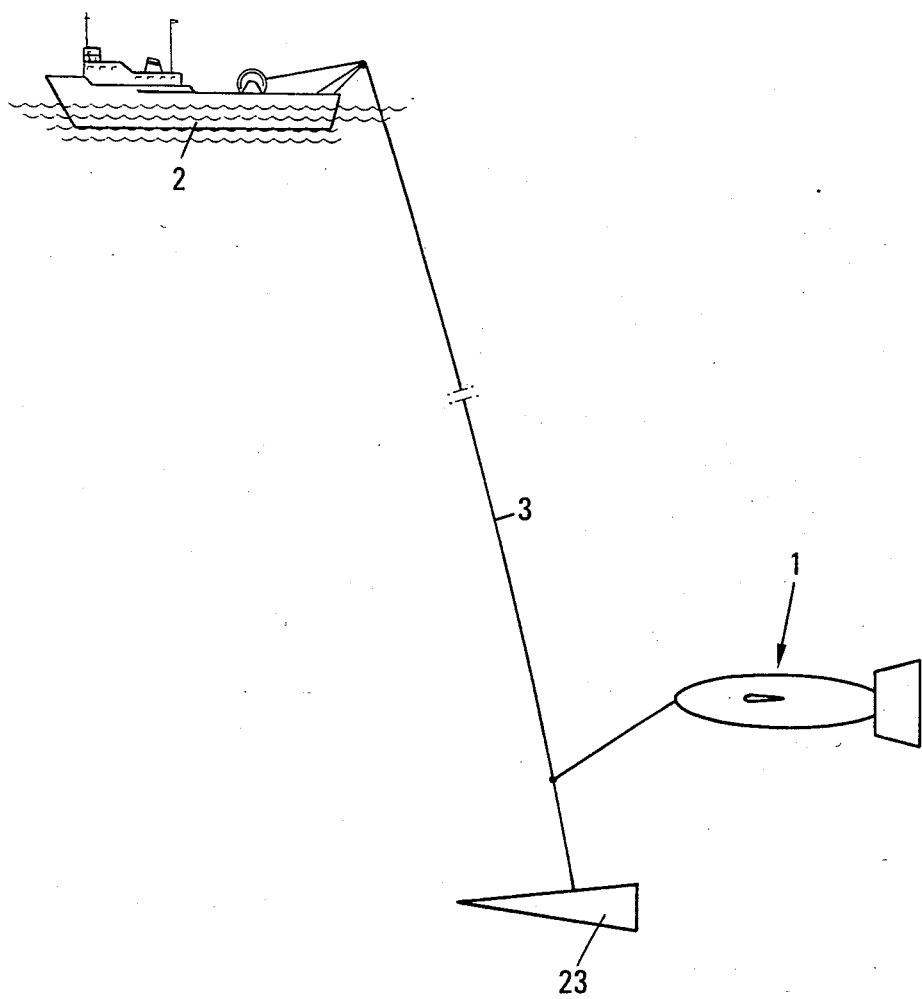
FIG. 1 shows a submerged object connected to a surface vehicle through a cable.
Figure 6:
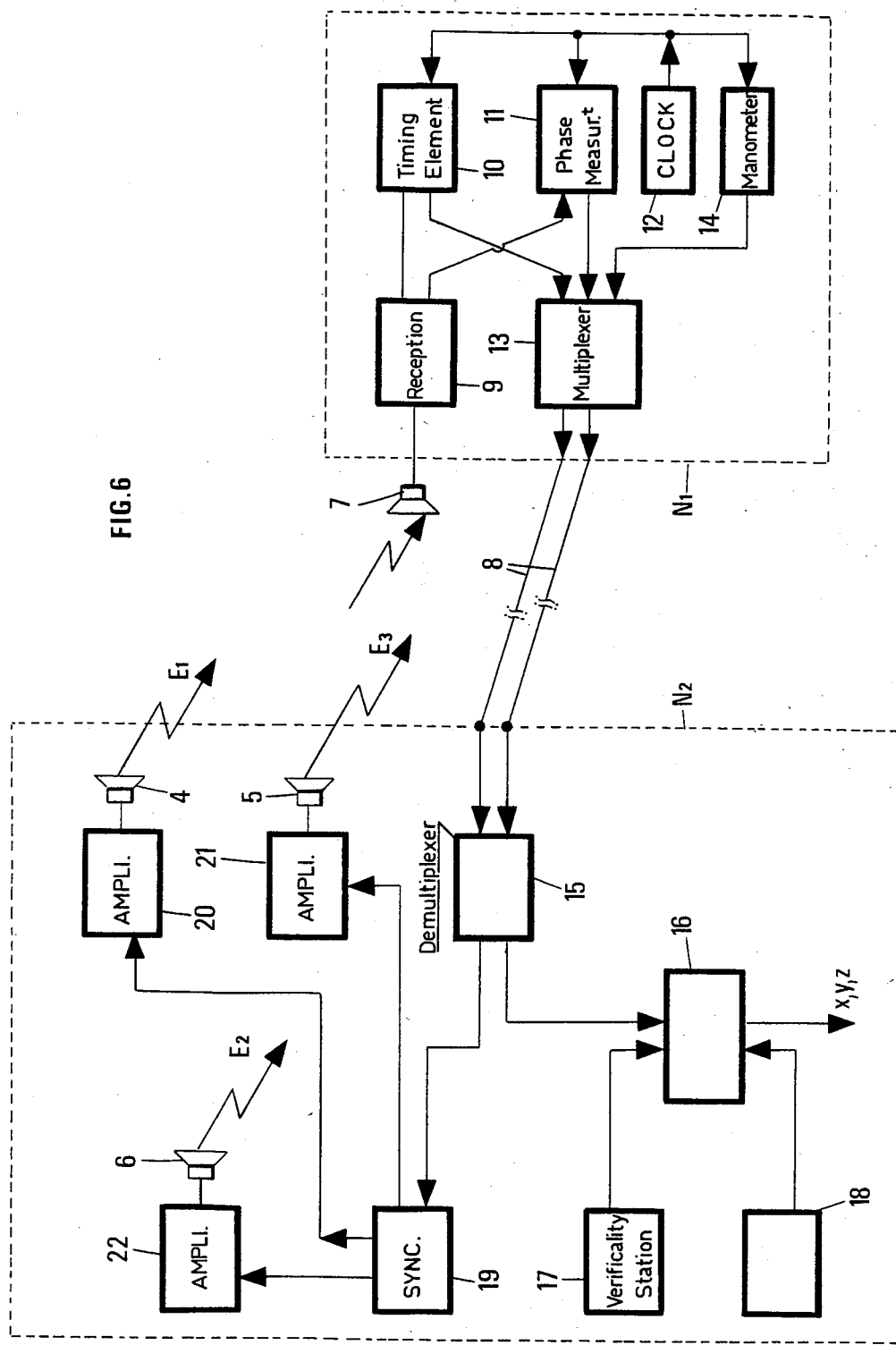
FIG. 6 diagrammatically shows a device for carrying out the first embodiment of the method.

When referring to FIG. 6, it can be seen that the device for carrying out the method of the invention, comprises an assembly $N_1$ located in the fish and an assembly $N_2$ placed on the ship. These two assemblies are interconnected through electric conductors 8 included in the connecting cable 3 (FIG. 1).

The assembly $N_1$ comprises a receiving assembly 9 adapted to amplify and put in shape the acoustic pulses received from the transducer 7 (FIG. 2), so as to determine the successive instants $t'_1$, $t'_3$, $t'_2$ (FIGS. 4 and 5) at which the respective amplitudes of these pulses reach for example a determined threshold value. It also comprises a timing element 10, a phase shift measuring assembly 11 of known type, a measuring device 14 comprising a manometric capsule, adapted to generate a digitized signal representing the depth in water of the fish, a clock member 12 which generates a periodic signal defining a time scale, and a multiplexer 13. The output of the receiving assembly 9 is connected to the input of the timing element 10 and to the input of the phase shift measuring assembly 11. The outputs of element 10, of the assembly 11 and of the pressure measuring device 14 are respectively connected to the inputs of multiplexer 13. The output of the clock member 12 is connected to the input of the timing element 10, of the phase-shift measuring assembly 11 and of the pressure measuring device 14. The outputs of multiplexer 13 are connected to electric conductors 8.

The assembly $N_2$ comprises a demultiplexer 15 whose inputs are connected to the other end of the electric conductors 8. An output of demultiplexer 15 is connected to a first input of a computer 16. A second input thereof is connected to a verticality central station 17 adapted to generate correction signals taking into account the pitch and roll effects. A third input of the computer 16 is connected to a gyro-compass 18 adapted to generate correction signals taking into account the heading variations of the ship. A second output of demultiplexer 15 is connected to the input of a synchronization element 19 adapted to generate control pulses of frequency f and duration $\Delta t$ at instants $t_1$, $t_2$, $t_3$ (FIG. 4). The frequency f is chosen equal to a sub-multiple of the frequency of the signal generated by the clock member (12) for example. The control pulses are respectively transmitted to the inputs of three amplifiers 20, 22, 21, whose outputs are respectively connected to three emitting transducers 4, 6, 5. Each of them, associated with an amplifier, forms an emission assembly.

The measurements of time and/or phase-shift effected by the assembly $N_1$ are transmitted to the assembly $N_2$ in digital form, thereby avoiding any degradation of the information irrespective of the length of the cable connecting the ship to the fish. The bits forming the digital words are transmitted to conductors 8 at a rate determined by the clock member 12. The signal generated by the latter is accordingly used for synchronizing the whole device.

The device operates in the following manner:

A reference pulse, formed, for example, of a leading edge of the signal emitted by the clock member 12, is transmitted at instant $t_1$ to the assembly $N_2$ at the surface through the conductors 8 and, simultaneously, is used for initiating the timing element 10 which begins to count the successive clock pulses. The reference pulse is received by the synchronization element 19 which generates a first pulse signal $E_1$ of frequency f and duration $\Delta t$, which is transmitted to amplifier 20, then a second signal $E_2$ and a third signal $E_3$, respectively transmitted to amplifiers 22 and 21 at instants $t_2$ and $t_3$, the time interval $T_E$ between the first and the third generated signals being a multiple of the clock signal period. The amplified pulse signals are successively applied to transducers 4, 6 and 5 and transmitted through water.

The transducer 7 successively receives the pulses propagated from the ship to the fish and the receiving assembly 9 amplifies them and puts them in shape. The leading edges of the reshaped pulses $R_1$, $R_3$, $R_2$ defining the successive instants $t'_1$, $t'_3$, $t'_2$, are transmitted to the timing element 10 which determines the number of clock signal periods accumulated between the initial instant $t_1$ and said instants with an error allowance at most equal to one period of the clock signal, and transforms these numbers to digital words.

In order to increase the accuracy of the measurements, the signals $R_1$, $R_3$, $R_2$ successively received by the receiving assembly are also applied to the phase shift measuring assembly 11. The latter measures phase shifts lower than one time unit between the received signals and the signal generated by the clock member 12 and digitize them.

The multiplexer 13 sequentially connects the timing element 10, the phase shift measuring assembly 11 and the pressure measuring device 14 to conductors 8 of the cable. The data sequentially received by the assembly $N_2$ are demultiplexed by the element 15 and then transmitted to the computer 16 which calculates the time intervals T, $T_x$, $T_y$ (FIG. 4), then the paramters R, $r_x$, $r_y$ Cos $\alpha$, in accordance with the group of relationships (2) and, finally, the coordinates X, Y in accordance with the group of relationships (1). The computer 16 is adapted to include in its calculations the data supplied by the verticality central station 17 and the gyro-compass 18.

The type of multiplexer 13 is selected in accordance with the number of oceanographic apparatuses contained in the fish in addition to the elements of the telemetering device assembly $N_1$, which must transmit to the ship the informations collected therein.

It would not be outside the scope of the invention to replace the connecting conductors 8 by any other data transmission means.

What is claimed is:

1. An acoustic telemetry method for determining the position of an object submerged at great depth with respect to a ship towing the object at the end of a cable, the method comprising:
    (a) transmitting acoustic pulses, each from one of at least three different emission locations of the ship, in a manner such that the displacement of the ship during the transmission time is substantially negligible and in a manner such that after propagation of the pulses to the object, said acoustic pulses can be discriminated from one another;
    (b) receiving the emitted pulses at a reception location on the submerged object;
    (c) measuring on the submerged object the respective propagation times of the emitted pulses from time of transmission to time of reception;
    (d) digitizing the measured values to provide data in digitized form;
    (e) transmitting the digitized data to the ship, through said cable; and
    (f) combining, on board the ship, the different measured values forming said transmitted digitized data, the values of the distances between the emission locations and the values of the time intervals between the transmitted pulses, and determining therefrom in a predetermined manner the coordinates of the submerged object with respect to the ship.

2. A method according to claim 1, wherein the acoustic pulses emitted from the different locations have the same frequency and are emitted successively, so as to be successively received at said reception location.

3. A method according to claim 1, wherein the acoustic pulses emitted from the different locations have different frequencies one from the other.

4. A method according to claim 1, further comprising measuring the depth in water of the object, digitizing such measurement information and transmitting it to the ship along with the other transmitted digitized data.

5. A method according to claim 4 wherein said measuring of the depth is conducted with a manometric capsule adapted for generating a digitized signal representative of the depth in the water of the object.

6. A method according to claim 1 further comprising measuring the phase shift in the transmitted pulses during propagation and transmitting the measured phase shift information in digitized form to the ship through the cable.

7. A method according to claim 1 further comprising measuring the pitch and roll of the ship while conducting the method and correcting for the combined different measured values by a factor representative of the measured pitch and roll.

8. A method according to claim 4 wherein the pulses are transmitted from three locations defining a system of axes O, x, y and z with respect to the ship wherein the position of the object is defined as a point M located at coordinates X, Y and Z wherein coordinate X is located along a longitudinal axis x of the ship, coordinate Y is located along an axis y parallel to the transverse axis of the ship and coordinate Z is located along a downwardly extending vertical axis relative to the ship from the surface, said coordinate Z being determined by said measuring of the depth of the object, with the coordinates X and Y being determined by the following relationships;

$$X = R/d' r_x \cos O,$$

$$Y = R/d \, r_y \cos O,$$

wherein R is the distance from intersection O of axes x, y and z at the ship, d is the distance between two of the transmitting locations along axis y crossing through intersection O, d' is the distance along axis x to the third transmitting location to intersection O, and O is the angle between the line projection of the distance R and the line projection of the relative position of the object along the x and y axes;

R, rx, ry and Cos O being determined by the relationships;

$$R = c(T + kT_x),$$

$$r_x = c(T_x - T_E),$$

$$r_y = c(T_y - kT_x),$$

$$\cos O = a - Z^2/R^2,$$

wherein c is the velocity of the acoustic waves through water, k is a number equal to the ratio between time intervals $(t_2 - t_1)$ and $(t_3 - t_1)$, with $t_1$ equal to time of transmission of the first pulse, $t_2$ is equal to the time of transmission of second pulse from transmission of first pulse and $t_3$ is equal to the time of transmission of third pulses from transmission of first pulse; and wherein $T_E$ is the time interval between the leading edges of the first and third pulse, T is the time interval between the leading edge of the second pulse and the instant at which the amplitude of the received first pulse passes through a predetermined threshold value, $T_x$ is the interval between the instants at which the amplitudes of the received first and third pulses reach the threshold value, and $T_y$ is the interval between the instants at which the amplitudes of the received first and second pulses reach the threshold value.

9. An apparatus for determining the position of a submerged object with respect to a ship towing the object at the end of a cable, said apparatus comprising emission means for emitting acoustic pulses from at least three different locations of the ship, pulse generating means located on the ship for generating a sequence of pulses of the same duration and of the same frequency with a time interval therebetween, means for transmitting said pulses to the respective emission means for emission therefrom, receiving means on the submerged object for receiving the emitted acoustic pulses, computation means on board of the ship for computing coordinates of the object with respect to the ship, clock means located in the submerged object for generating a signal defining a time scale for controlling the pulse generating means, timing means and phase-shift measuring means with said object for measuring the propagation time of the different emitted acoustic pulses of the sequence in relation to the period of the signal generated by the clock means, depth measuring means with said object for measuring the depth in the water of the object, the depth means incorporating digitization means operative for digitizing the measuring values by making use of the signal generated by the clock, and trasmission means for transmitting the measured values in digitized form from the submerged object to the computation means on board the ship for computing the position of the object.

10. An apparatus according to claim 9, wherein the transmission means comprises a multiplexer arranged for sequentially connecting to the cable the timing means, the phase-shift measuring means and the depth measuring means, and a demultiplexer connected to the cable at the other end, on the one hand, and to the computation and the pulse generating means on the other hand.

11. An apparatus according to claim 9 wherein the computation means has associated therewith a verticality central station and a gyrocompass.

12. An apparatus according to claim 9 wherein the emission means comprise one transducer disposed in the longitudinal plane of the ship and two transducers disposed in a transverse plane relative to the ship, the intersection of said planes defining a system of axes, associated with the ship, with respect to which the position of the object is determined.

13. An apparatus according to claim 12 wherein the transducers are disposed at locations of the ship remote from one another.

* * * * *